United States Patent [19]

Wilbur et al.

[11] Patent Number: 5,235,880
[45] Date of Patent: Aug. 17, 1993

[54] DETECTABLE CUTTER KNIFE AND METHOD FOR MAKING SAME

[75] Inventors: John H. Wilbur, Medford; Gale M. Wood, Klamath Falls, both of Oreg.

[73] Assignee: Simco/Ramic Corp., Medford, Oreg.

[21] Appl. No.: 849,271

[22] Filed: Mar. 10, 1992

[51] Int. Cl.⁵ .............................. B26D 7/22
[52] U.S. Cl. ...................... 83/13; 83/62.1; 83/303; 83/337
[58] Field of Search .............. 83/13, 23, 62.1, 303, 83/337; 30/344; 340/572; 361/180

[56] References Cited

U.S. PATENT DOCUMENTS

| | | | |
|---|---|---|---|
| 4,074,868 | 2/1978 | Link | 241/261 X |
| 4,178,684 | 12/1979 | Mightly | 30/344 |
| 4,520,702 | 6/1985 | Davis et al. | 83/71 |
| 4,969,267 | 11/1990 | Anenberg | 30/344 X |
| 5,029,504 | 7/1991 | Wilbur et al. | 83/168 |

*Primary Examiner*—Frank T. Yost
*Assistant Examiner*—Kenneth E. Peterson
*Attorney, Agent, or Firm*—Stoel Rives Boley Jones & Grey

[57] ABSTRACT

A detectable cutter knife (100) is useful as a replacement for a conventional cutter knife used in product inspection and cutting systems of the type having a cutting wheel assembly. The cutting wheel assembly includes a knife guide having angularly spaced radially oriented knife support slots through which cutter knives having tangs extending therefrom move between a retracted noncutting position and an extended cutting position. The detectable cutter knife (100) includes a shank (102), a tang (114), and an amount of metallic material in the shank sufficient to stimulate a metal detector. The use of metallic material in the shank permits automatic and efficient detection of a broken cutter knife (100) and its removal from product flow. Preferably, the metallic material takes the form of a ball bearing (152) secured within a hole (150) positioned in a low-stress area (154) of shank (102).

18 Claims, 4 Drawing Sheets

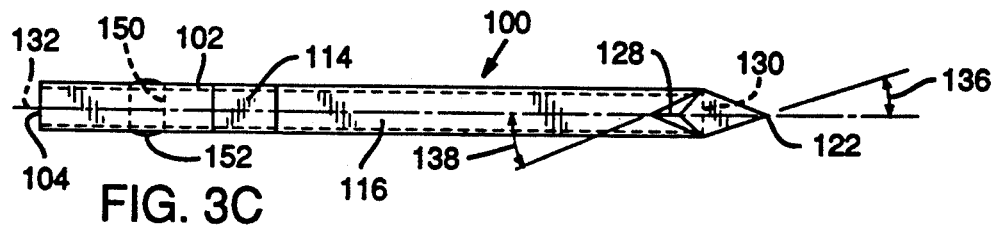
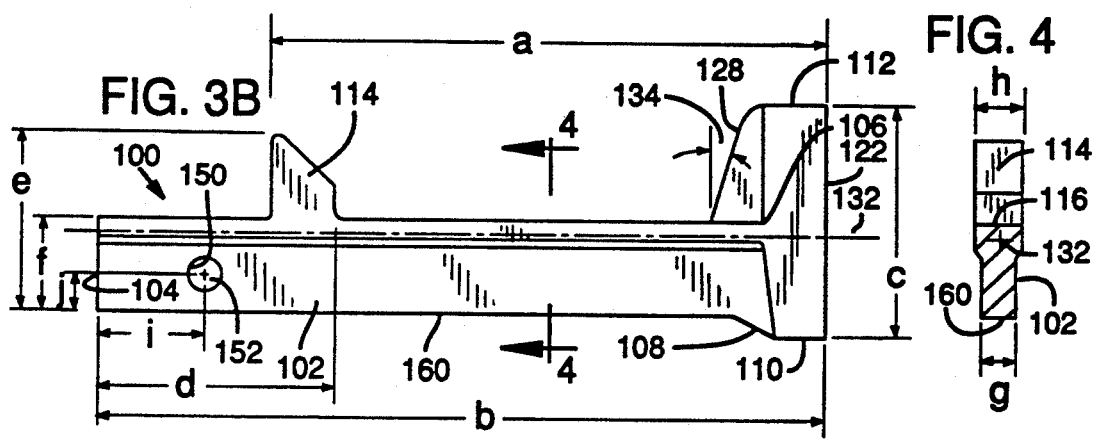
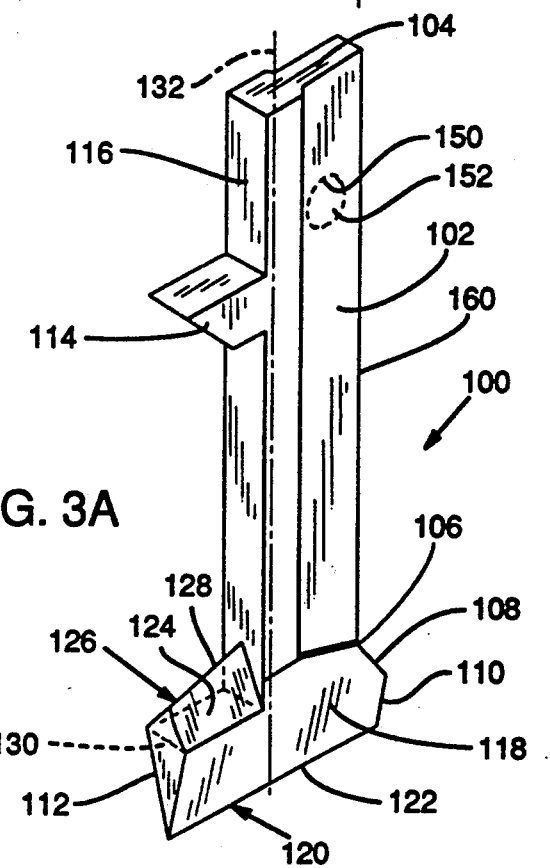

DETECTABLE CUTTER KNIFE AND METHOD FOR MAKING SAME

TECHNICAL FIELD

The present invention relates to product inspection and cutting systems and, in particular, to a method for making and detecting a nonmetallic cutter knife broken during use in such systems.

BACKGROUND OF THE INVENTION

With reference to FIG. 1, high-speed product inspection and cutting systems 2 that include an inspection station 3 for detecting defects in a specimen product 4 and a cutting station 5 for removing the defects are in widespread use in, for example, the processed food industry. In such a system 2, a conveyor belt 6 carries previously inspected product 4 material, such as elongated potato strips, carrots, or green beans, in a direction 7 generally orthogonal to the axis of rotation of a cutting wheel assembly 10, which is mounted overhead the conveyor belt 6.

The cutting wheel assembly 10, in response to commands delivered from an inspection station 3, selectively deploys certain cutter knives 12 radially outwardly through slots in a knife guide 14 to excise defective regions from the product 4 as it appears directly below the cutting wheel assembly 10. Having cut the product 4, the selected knives 12 retract into their respective knife support ring slots 16 until the knives 12 are again deployed. A prior art knife 12 of a type that can be used in a typical cutting wheel assembly 10 is described in detail in U.S. Pat. No. 5,029,504 of Wilbur et al. A prior art cutting wheel assembly 10 into which the prior art knife fits is described below with reference to FIGS. 2A and 2B.

With reference to FIGS. 1 and 2, a typical inspection and cutting system employs a rotating cutting wheel assembly 10 that carries multiple plastic cutter knives 12 angularly spaced around the periphery of a knife support ring or knife guide 14. Each knife guide 14 has, positioned back-to-back and around its periphery, two rings of slots 16 each of which holds a cutter knife 12. Each ring of slots 16 of the knife guide 14 fits over a different stationary cam track structure 18 and imparts rotational motion to the cutter knives 12 so that they slide along the cam track structure 18 in either one of its inner or outer annular tracks 22 and 24, respectively.

A tang 26 extends from an elongated shank 28 of each cutter knife 12 and is sized to fit in and slide between the inner and outer annular tracks 22 and 24. The inner annular track 22 receives the tangs 26 of the cutter knives 12 whenever they are in a retracted noncutting position 32, and the outer annular track 24 receives the tangs 26 whenever they are in an extended cutting position 34. A knife gate mechanism 36 guides tangs 26 into the track specified by the inspection station.

The axis of rotation 38 of the knife guide 14 is coincident with the center point 40 of the annular tracks 22 and 24. Each one of the slots 16 holds and guides a cutter knife 12 as it moves radially between the retracted noncutting position 32 and the extended cutting position 34. The recessed nature of side walls 42 of the shank 28 allows a liquid lubricant to flow between the cutter knife 12 and the sides of the slots 16 to reduce the friction forces between them.

Shifting the cutter knives 12 from one track to the other causes the cutter knives to move through a interference zone or transition 44 between the inner and outer annular tracks 22 and 24. Although transition 44 is tapered to minimize its profile, the tangs 26 ride against the sidewalls of transition 44 and exhibit wear. If the wear becomes excessive, a tang 26 may be worn down or broken off so that a cutter knife 12 is no longer held in the cutting wheel assembly 10. The loose cutter knife 12 then falls or is thrown into the product flow.

Although tang breakage is infrequent, a broken cutter knife 12 is a contaminant that must be removed before the inspected product is shipped. Such broken cutter knives 12 are, however, difficult to automatically detect and remove from the product, especially because they are typically made of plastic. The conventional method for removing broken cutter knives 12 relies on a person to watch the product flow and physically remove them.

SUMMARY OF THE INVENTION

The present invention is a detectable cutter knife that may be used as a replacement for a prior art cutter knife in an inspection and cutting system of the type described in U.S. Pat. No. 4,520,702 of Davis et al. The cutter knife is of a shape similar to that of a typical cutter knife, but also includes an amount of metal effective to stimulate an in-line metal detector 13 currently existing in most packaging rooms 15. Such a metal detector is conventionally employed to detect nuts, bolts, metal slivers, and parts worn from processing machinery that periodically contaminate product flow.

A preferred method for introducing metal into the cutter knives entails drilling an undersized hole in a low-stress area of a cutter knife and pressing into the hole a ferrous ball bearing of a size and metal density sufficient to stimulate a metal detector. The cold-flow of plastic around the ball bearing securely retains it within the cutter knife. This method has been determined not to jeopardize the integrity of the cutter knife or to reduce its performance lifetime.

An object of the present invention is, therefore, to provide cutter knives for use in a high-speed product inspection and cutting system that are easily and automatically discernable from the product.

Another object of the present invention is to provide such cutter knives containing an amount of metal that stimulates a metal detector but does not significantly affect the performance or durability of the cutter knives.

A further object of the present invention is to provide such a cutter knife that secures a ball bearing in a low-stress area.

Still another object of the invention is to provide such a cutter knife of a design that may be used as a replacement for cutter knives currently used in high-speed product inspection and cutting systems.

Additional objects and advantages of the present invention will be apparent from the detailed description of a preferred embodiment thereof, which proceeds with reference to the accompanying drawings.

BRIEF DESCRIPTION OF THE DRAWINGS

FIGS. 3A, 3B, and 3C are respective isometric, side elevation, and top views of a detectable cutter knife of the present invention.

FIG. 4 is a sectional view taken on lines 4—4 of FIG. 3B.

DETAILED DESCRIPTION OF PREFERRED EMBODIMENT

Figure 2A:
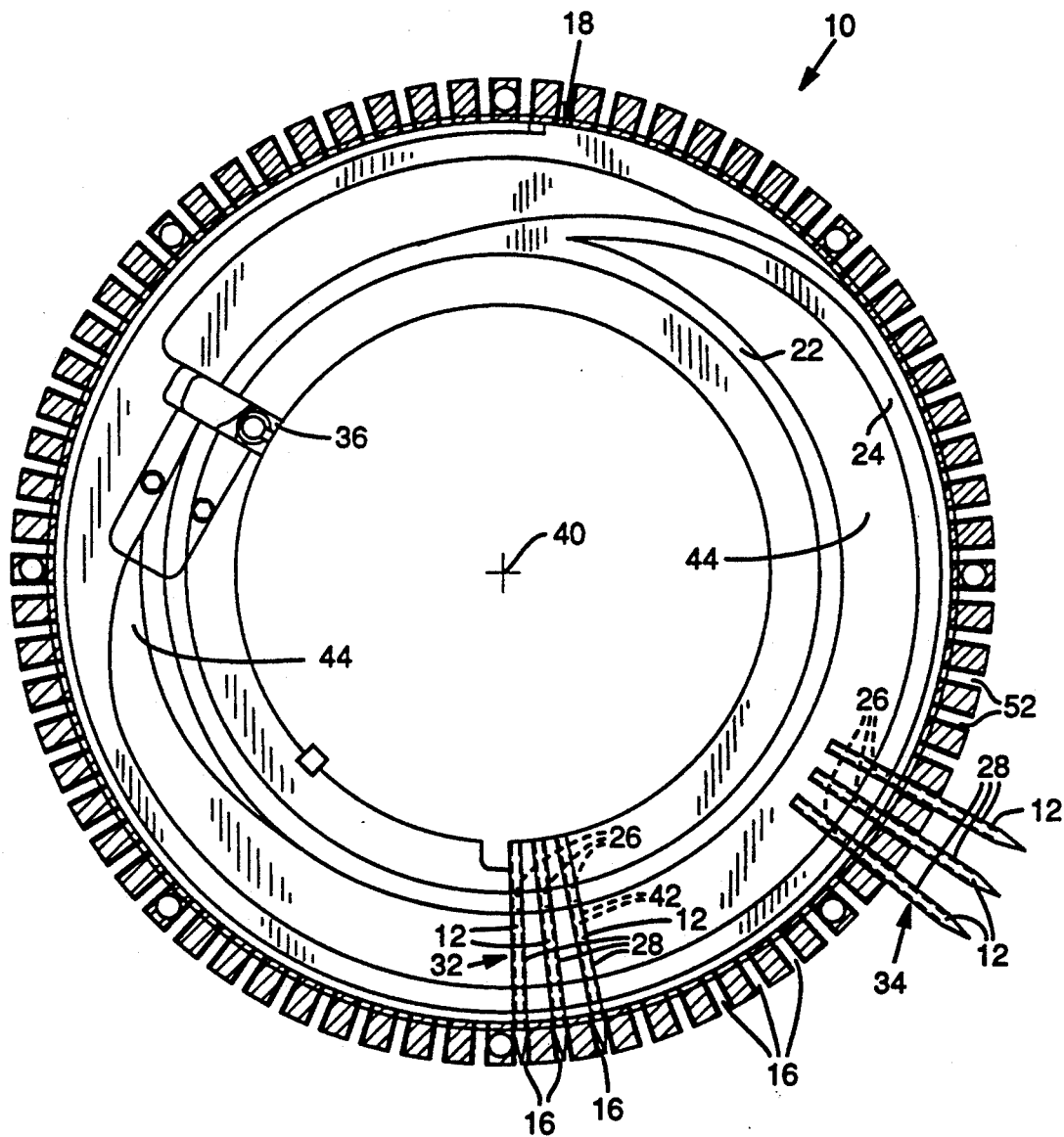
FIG. 2A is a top view of a prior art knife guide shown in cross section encircling a cam track structure that has inner and outer annular tracks along which multiple cutter knives slide selectively between respective retracted noncutting and extended cutting positions.
Figure 2B:
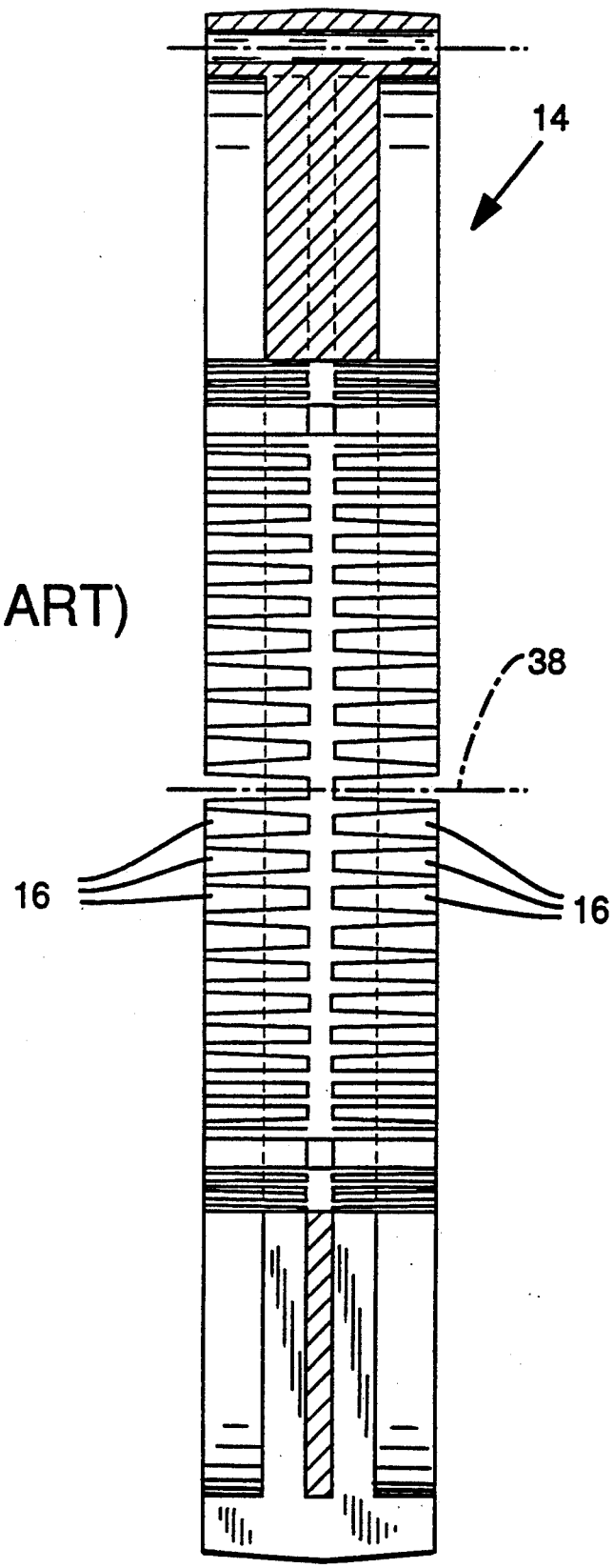
FIG. 2B is a side view with a magnified portion of a prior art knife guide that supports and imparts rotational motion to the cutter knives so that they slide along the cam track structure of FIG. 1 in either one of its inner or outer annular tracks.

With reference to FIGS. 3A, 3B, and 3C and FIG. 4, a preferred embodiment of a detectable cutter knife 100 of the present invention includes an elongated shank 102 having a distal end 104 and an end 106 terminating with a foot 108 having a heel end 110 and a toe end 112. Shank 102 is positioned close to heel end 110, thereby giving cutter knife 100 the shape of a leg. A tang 114 that extends from a slide surface 116 of shank 102 at a position about one-third the distance from distal end 104 to end 106 is sized to fit in and slide between inner track 22 and outer track 24 of cam track structure 18 (FIG. 2A), as was previously described.

Foot 108 includes a bottom 118 from which projects a primary blade 120 having a cutting edge 122 extending outwardly of bottom 118 and a top 124 from which projects a secondary blade 126 having a cutting edge 128 extending outwardly of top 124. Primary and secondary blades 120 and 126 are of wedge shapes, tapering from a common base 130 to their respective cutting edges 122 and 128, which are preferably coplanar (FIGS. 3A and 3C).

Cutting edge 122 of primary blade 120 defines a straight line disposed generally perpendicular to central longitudinal axis 132 of shank 102 and extends between heel end 110 and toe end 112 of foot 108. Cutting edge 128 of secondary blade 126 is inclined at an angle 134 of about 15 degrees relative to cutting edge 122 and extends between end 106 of shank 102 and toe end 112 of foot 108. Secondary blade 126 forms, therefore, a web structure between shank 102 and toe end 112 of foot 108.

With particular reference to FIG. 3C, primary and secondary blades 120 and 126 define back-to-back wedges having common base 130 and side surfaces tapering uniformly to apexes formed by the respective cutting edges 122 and 128. Each of the side surfaces of primary blade 120 inclines at an angle 136 of about 20 degrees relative to axis 132. Each of the side surfaces of secondary blade 126 inclines at an angle 138 of about 23 degrees relative to axis 132.

In operation, primary blade 120 cuts product presented to it when cutter knife 100 is deployed in an extended cutting position. Secondary blade 126 severs product remnants lying on slide surface 116, top 124, and secondary blade 126 of foot 108 as cutter knife 100 returns to a retracted noncutting position. Severing the product remnants prevents the jamming of cutter knife 100 with such remnants in its corresponding slot 16 in knife guide 14 of cutting wheel assembly 10.

Figure 1:
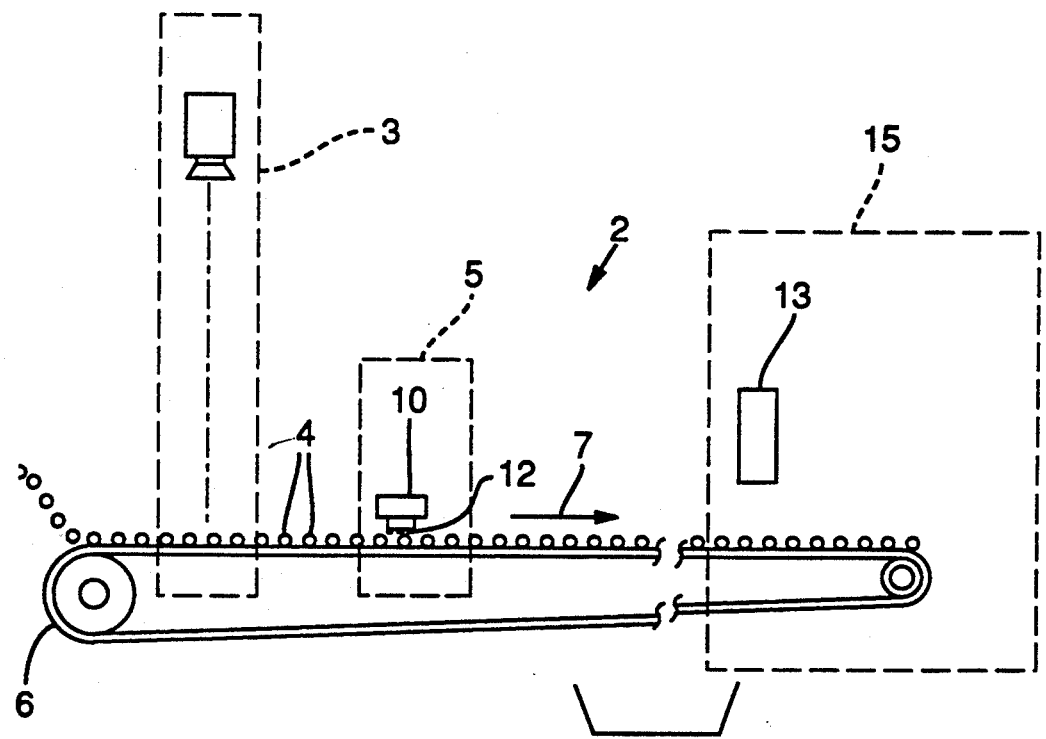
FIG. 1 is a simplified side view of an exemplary inspection and cutting system that can employ a cutter knife of the present invention.

The use of primary blade 120 and secondary blade 126, as described above, facilitates the-use of a steeper cutting angle 136 than that typically found in cutter knives that do not have a secondary blade 126. Cutter knives without a secondary blade 126 are shown in FIGS. 1A, 1B, and 1C of U.S. Pat. No. 5,029,504 and typically have cutting angles of around 10 degrees. A steeper angle causes cutter knife 100 to act as a splitting wedge and induces the product remnants to slide off the knife blade.

With particular reference to FIGS. 3A, 3B, and 3C, a preferred embodiment of cutter knife 100 includes an undersized hole 150 adapted to receive a ball bearing 152. Hole 150 is preferably drilled into a low-stress area 154 of shank 102 with a 7/64" twist drill. Ball bearing 152 is of sufficient size and density to stimulate a conventional metal detector, such as a Model 51238-3 manufactured by Abbott Ball Co., PO Box 1011 Railroad Place, Elmwood, Conn., placed over a product conveyor belt. Cutter knife 100 is formed of plastic materials typically of the Acetal type, which is manufactured by Columbia Medical & Surgical, Inc., Tigard Industrial Park, 9800 SW Tigard Street, Tigard, Oreg. 97223. The plastic material around hole 150 snugly cold-flows over the surface of ball bearing 152 to secure it within hole 150.

With reference to FIGS. 3B and 4, a cutter knife 100 having approximate dimensions a, b, c, d, e, f, g, and h (where a is 2.125", b is 2.780", c is 0.970", d is 0.885", e is 0.750", f is 0.375", g is 0.135", and h is 0.170") preferably includes a ball bearing 152 of 0.125" diameter that is press fit into a hole 150 of 0.109" diameter. Ball bearing 152 preferably is made of a ferrous alloy and is coated with nickel to prevent rust. The center of hole 150 is preferably positioned at a distance i of 0.375" from distal end 104 and a distance j of 0.150" from surface 160 of shank 102.

One skilled in the art will appreciate that a variety of positions, shapes, or sizes, for hole 150; alternative metal shapes or compositions; and alternative means of attachment may be employed without departing from the scope of the present invention. For example, cutter knife 100 may be injection molded with a preformed hole 150, using Delrin TM, manufactured by Du Pont Nemours E.I. and Co., Nemours 107 Market Street, Wilmington; Del. 19808. It will be appreciated that such a cutter knife 100 may be injection molded around a small piece or pieces of ferrous metal, or the ferrous metal may be pressed into cutter knife 100 after it hardens.

One skilled in the art will also appreciate that the present invention may be employed in a variety of nonmetallic cutter knife embodiments, including knives without secondary blades 126.

It will be obvious to those having skill in the art that many changes may be made to the details of the above-described preferred embodiment of the present invention without departing from the underlying principles thereof. The scope of the present invention should, therefore, be determined only by the following claims.

We claim:

1. A system for cutting a product, comprising:
   a cutting machine;
   a substantially nonmetallic cutter knife having a blade section and an engaging section adapted for engagement with the cutting machine;
   a metal detector positioned downstream from the cutting assembly; and
   an amount of metallic material secured to the cutter knife, the amount of metallic material being sufficient to stimulate the metal detector.

2. The system of claim 1 in which the cutter knife comprises an elongated nonmetallic shank and the amount of metallic material is secured to the shank.

3. The system of claim 1 in which the cutting machine comprises a cutter knife activator and the engagement section of the cutter knife comprises a tang adapted for engagement with the cutter knife activator.

4. The system of claim 1 in which the cutter knife further comprises an elongated shank having a distal end positioned the length of the shank from the blade section and a tang protruding from the shank, such that the amount of metallic material is secured within a hole positioned in a low-stress area of the shank between the tang and the distal end.

5. The system of claim 1 in which the amount of metallic material secured to the cutter knife comprises a ball bearing.

6. The system of claim 1 in which the cutter knife has an elongated shank; the engagement section includes a tang that protrudes from the shank; and the cutting machine includes a cutting wheel assembly that further comprises:
   a knife guide having angularly spaced radially oriented knife support slots through which the cutter knife is permitted to move between a retracted noncutting position and an extended cutting position; and
   a cam track structure having an inner annular track and an outer annular track to engage the tang such that tang engagement with the inner annular track determines a noncutting position and tang engagement with the outer annular track determines a cutting position.

7. The system of claim 6 in which the amount of metallic material comprises a ball bearing secured within a hole positioned in a low-stress area of the shank.

8. The system of claim 1 in which at least one of the cutter knives is injection molded to contain a hole adapted to receive the metallic material.

9. The system of claim 1 in which the nonmetallic material comprises plastic.

10. The system of claim 1 in which the product is a food item.

11. The system of claim 1 in which: the cutting machine is adapted for high-speed food processing; the cutter knife comprises injection molded plastic adapted to receive a ball bearing; and the product comprises a food item.

12. A method of detecting the presence of a cutter knife, comprising:
   providing plural substantially nonmetallic cutter knives, each having an engagement section and an amount of metallic material sufficient to stimulate a metal detector;
   providing a cutting machine for cutting a product, the cutting machine engaging the cutter knives at their engagement sections;
   providing a metal detector downstream from the cutting machine;
   conveying the product and dislodged cutter knives away from the cutting machine and toward the metal detector; and
   detecting with the metal detector the presence of dislodged cutter knives intermixed with product.

13. The method of claim 12 further comprising providing each cutter knife with an elongated nonmetallic shank having a blade section, the amount of metallic material being secured to the shank.

14. The method of claim 13 further comprising providing the metallic material as a ball bearing secured within a hole positioned in the shank.

15. The method of claim 13 further comprising providing the cutter knife with a tang as the engagement section that protrudes from the shank and is adapted for engagement with an inner and an outer annular tract of a cam track structure of the cutting machine, the cutting machine including a knife guide having angularly-spaced radially-oriented knife support slots through which the cutter knife is permitted to move between a retracted noncutting position and an extended cutting position corresponding to the tang's engagement with the inner and outer annular tracts.

16. The method of claim 12 further comprising providing the product as a food item.

17. The method of claim 12 further comprising providing the cutter knife as injection molded plastic containing a hole adapted to receive a ball bearing.

18. The method of claim 12 further comprising:
   inspecting the product for defects; and
   employing the cutter knives to remove the defects.

* * * * *